Sept. 28, 1965    L. J. WOLF    3,208,615
FLAT BED TRAILER
Filed Aug. 21, 1962    7 Sheets-Sheet 1

Inventor.
Lloyd J. Wolf.
By. John W Darley
Attorney.

Sept. 28, 1965    L. J. WOLF    3,208,615
FLAT BED TRAILER

Filed Aug. 21, 1962    7 Sheets-Sheet 7

INVENTOR
LLOYD J. WOLF
BY Bedell & Burgess
ATTORNEYS

United States Patent Office 3,208,615
Patented Sept. 28, 1965

3,208,615
FLAT BED TRAILER
Lloyd J. Wolf, 4580 Bordeaux, Dallas, Tex.
Filed Aug. 21, 1962, Ser. No. 221,394
13 Claims. (Cl. 214—505)

This application is a continuation in part of my copending application Serial No. 782,244, filed December 22, 1958, now abandoned, relating to vehicles of the tractor-trailer type wherein the trailer includes a flat, open bed for the transport of heavy equipment, such as crawler or wheeled tractors, engines, oil field pumps and the like, as well as goods of lighter weight.

The problem involved is moving a piece of equipment, such as one of those mentioned above or others, from a position in which it rests on the ground or at some elevation below the normal horizontal position of the trailer bed to a position on this bed and to accomplish this without the assistance of separate lifting apparatus, such as a crane, which is usually not available. The specific steps by which the foregoing is accomplished with the present type of tractor-trailer will be outlined in detail hereinafter, but, briefly, it encompasses an uncoupling of the tractor and trailer at the fifth wheel of the former, a dropping of the forward end of the trailer to the ground, and a hauling of the load on to the trailer bed in its inclined position by a winch on the tractor, followed by a recoupling of the tractor and trailer. This procedure requires not only uncoupling of the trailer from the tractor, but several movements of the tractor and adequate space is not always available.

It is therefore one object of the invention to provide a tractor-trailer vehicle of the flat bed type in which the trailer is constructed and arranged to eliminate any necessity for uncoupling thereof from the tractor to enable the sliding or wheeling of the equipment or load onto the trailer bed.

A further object is to provide a vehicle of the indicated type in which the trailer is conditioned, during the loading period, to permit a substantial portion of its bed to assume an inclined position in which its rear end is lowermost.

These and further objects of the invention will be set forth in the following specification, reference being had to the accompanying drawings, and the novel means by which the objects are effectuated will be definitely pointed out in the claims.

Figure 1:
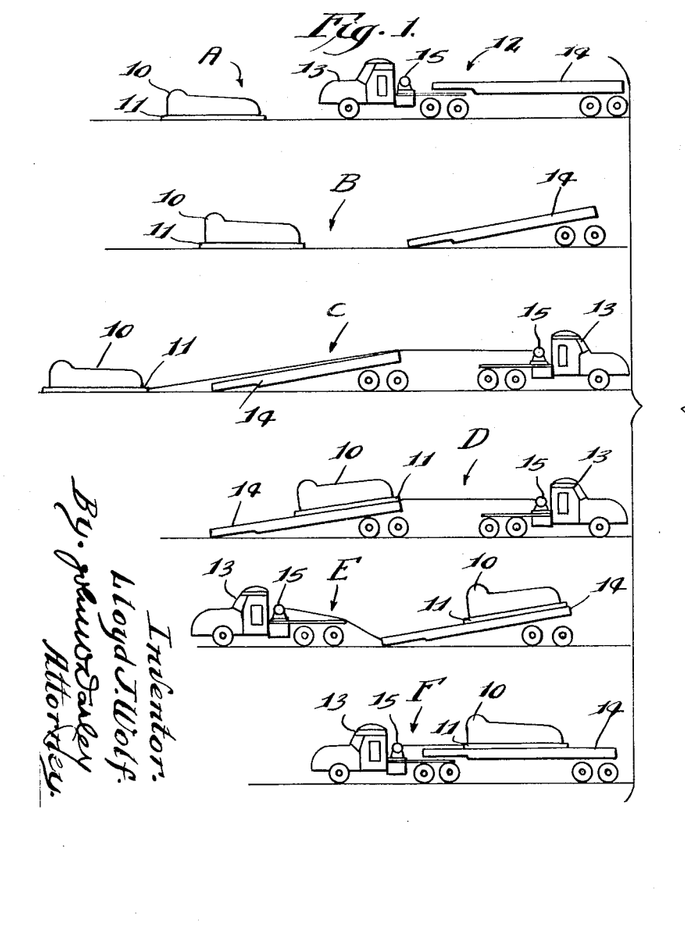
FIGS. 1 and 2 are schematic views showing, respectively, the steps involved in loading the trailer of a conventional vehicle and that of the present invention.

Referring to FIG. 1, there is schematically shown the successive steps six in number, necessary to load a piece of equipment, such as a pump 10 mounted on skids 11 and resting on the ground, on to a conventional, tractor-trailer vehicle 12 including a tractor 13 and a trailer 14. The vehicle is first driven to position A with the tractor 13 between the pump 10 and trailer 14, the latter is uncoupled to rest its forward end on the ground (position B), and the tractor 13 is then driven and backed to position C. A cable from a winch 15 on the tractor 13 is then passed lengthwise over the trailer 14 and secured to the pump 10 and the later is pulled on and to the rear end of the suitably held trailer 14 (position D), the cable is unfastened, and the tractor 13 is driven and backed adjacent the front end of the trailer 14 (position E). The front end of the trailer 14 is then lifted to coupling position by attaching the cable thereto, it being understood that a suitable roller or sheave arrangement (not shown) may be used to insure an adequate lifting of the trailer front end. The cable is then attached to the pump 10 for the moving of the latter forwardly to riding position (position F).

Figure 2:
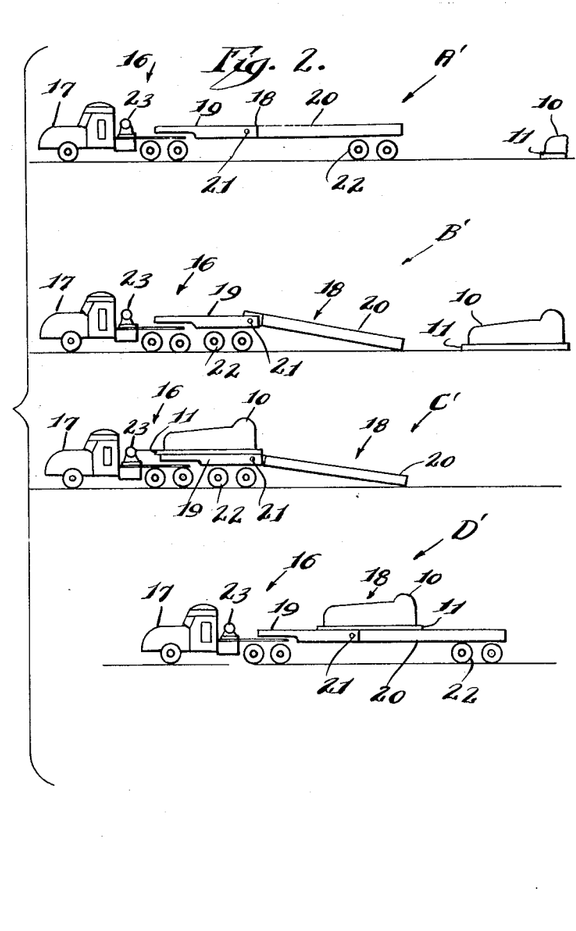

The advantages of the improved vehicle 16 are schematically shown in FIG. 2, the loading steps being reduced from six to four and the tractor and trailer being coupled at all times. The vehicle 16 includes a tractor 17 and a flat bed trailer 18 having front and rear sections 19 and 20 which are hingedly connected at 21, the front section 19 being coupled to the tractor 17 in the usual manner. When in load carrying position, the rear end of the trailer 18 is supported by a tandem axle assembly 22 detachably locked thereto and whose relation to the trailer is such that it may be relatively moved from a supporting position beneath the rear end of the rear trailer section 20 to a supporting position beneath the rear end of the front trailer section 19, the details being presently described. For maximum load carriage, a trailer having a tandem axle assembly is normally coupled to a tractor having a like rear axle assembly, but where the trailer has a single rear axle, it may be coupled to a tractor having either a single or a tandem rear axle. This invention is applicable to either situation.

To place the pump 10 on the vehicle 16, the latter is first backed to position A' in relation to the pump 10, the tandem axle assembly 22 is unlocked from the trailer section 20, and the brakes of this assembly are set. The vehicle 16 is then further backed toward the pump 10 until the tandem axle assembly 22 is under the trailer section 19 (position B'). The rear end of the trailer section 20, being then unsupported, rests on the ground. A cable from a winch 23 on the tractor 17 is then attached to the pump 10 and the latter is hauled up the inclined plane of the trailer section 20 and on to the trailer section 19 (position C'). In this position, the trailer section 20 is free of load and to restore it to load carrying position, the brakes on the tandem axle assembly 22 are set, and the vehicle 16 is moved forward until the assembly 22 is as shown in position D', i.e., in load carrying position. During this movement, the assembly 22 cams or wedges the rear trailer section 20 to the horizontal position shown. The pump 10 is then winched back to the normal load carrying position between the rear wheels of the tractor 17 and the tandem axle assembly 22. As an alternative, the tandem axle assembly 22 may be winched between its forward and rear positions.

Figure 3:
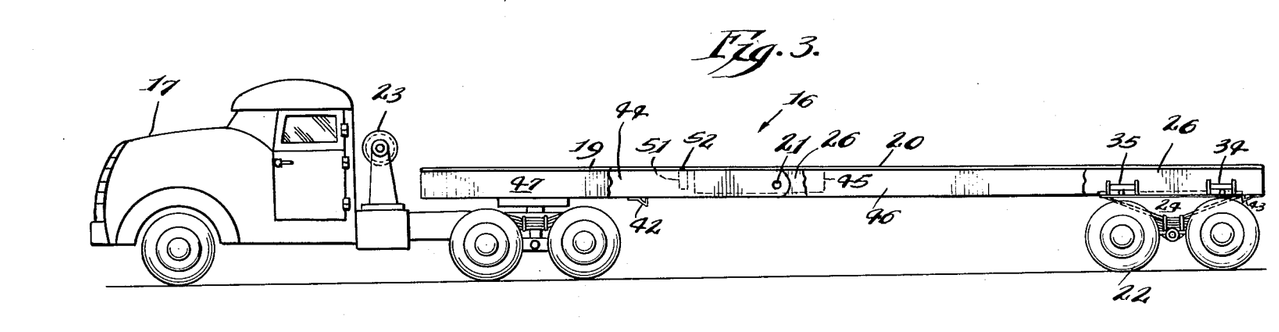
FIGS. 3 and 4 are enlarged side elevations of the improved vehicle in running or loaded and loading positions, respectively.
Figure 4:
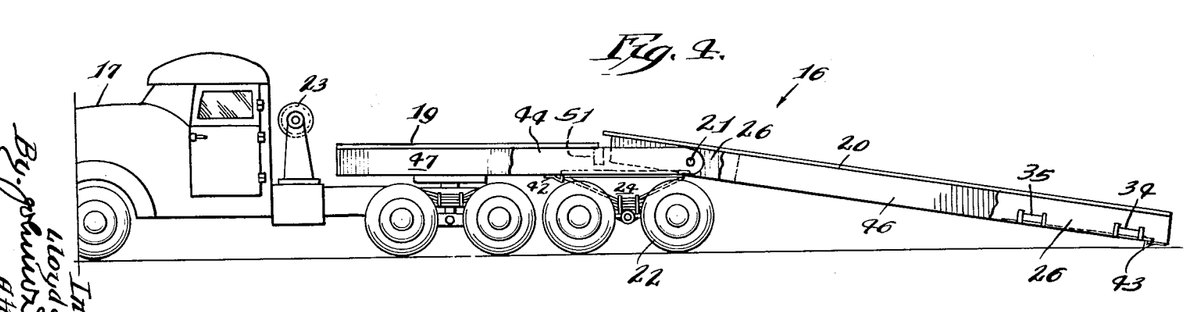

The improved vehicle 16 is shown enlarged in load carrying and loading positions in FIGS. 3 and 4, respectively. As noted above, while the trailer 18 is shown as having a tandem axle assembly 22, the latter could, so far as the application of this invention is concerned, be replaced by a single axle.

Load carrying requirements dictate the choice of trailer axle. Further, the invention generically contemplates a shifting of the trailer rear axle assembly, single or tandem, between two limiting positions, forward and rear, and a locking or securing of such axle assembly in the rear position. For purpose of disclosure, the trailer will be considered as having a tandem axle assembly and one method of slidably relating this axle assembly to and locking the same to the trailer will be shown, being identical with that described and claimed in my United States Letters Patent No. 2,682,419, dated June 29, 1954. However, this particular method is not to be considered as restrictive.

Figure 5:
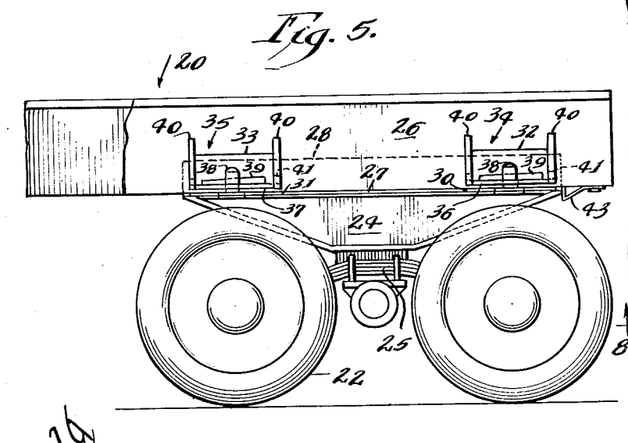
FIG. 5 is an enlarged, fragmentary view of the rear end of the trailer in FIG. 3 showing a suggested method of locking the tandem axle assembly in its rearmost or load carrying position.
Figure 6:
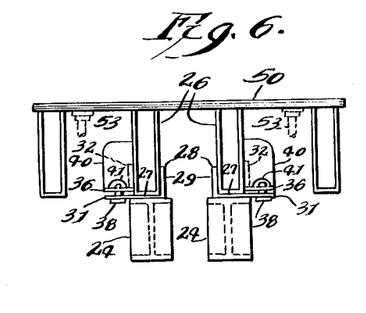
FIG. 6 is a fragmentary, rear end view of the trailer, the wheels and suspension being omitted.

Referring to FIGS. 5 and 6 which show the rear end of the trailer rear section 20, the tandem axle assembly 22 includes a pair of beams 24 spaced from and symmetrical with respect to the longitudinal axis of the trailer section 20 and which transmit the trailer load through springs 25 in the usual manner to the trailer axles (not shown), each beam 24 being located beneath a longitudinal center frame member 26 which, for convenience, is shown as having a channel section. The horizontal wing 27 of a metallic angle 28 is positioned between the under surface of each frame member 26 and the top surface of the beam 24, extends for the full length of this beam and is welded thereto, but is not connected directly to the frame member 26. From the foregoing and so far as described, it will be apparent that the trailer load is transmitted through the wings 27 to the beams 24 and that when the trailer axle assembly 22 is shifted forwardly relative to the trailer section 20 (see FIG. 2), the wings 27 provide smooth surfaces along which the frame members 26 relatively slide. The vertical wings 29 of the angles 28 abut the inner sides of the center frame members 26, respectively, and serve as guides for maintaining the axle assembly 22 in proper alignment relative to the trailer rear section 20 in any shifted movement and position of the assembly.

Adjacent the rear and forward ends of each wing 27 and forming a part thereof, horizontal pads 30 and 31, respectively, of identical shape extend laterally outward therefrom, the pads being spaced from each other lengthwise of the respective angles 28. Along the outer surface of each frame member 26, the vertical wings 32 and 33 of identical angles 34 and 35, respectively, are welded thereto and spaced therealong, the spacing between such angles being equal to the lengthwise spacing of the pads 30 and 31. The horizontal wings 36 and 37 of the angles 34 and 35, respectively, extend laterally outward from the associated frame member 26 in registering relation to the pads 30 and 31, respectively.

To secure the axle assembly 22 in the position shown in FIG. 5 and on each side of the trailer section 20, headed pins 38 are pushed upwardly through registering apertures in the pad 30 and wing 36, and in the pad 31 and wing 37, the upper end of the pin 38 extending a convenient distance above the wing 36 or the wing 37 as the case may be. To lock the assembly 22 in position, a tapered lock pin 39 is driven transversely to and through a suitable aperture in the shank of each headed pin 38 so that the lock pin is generally parallel to the wings 36 and 37. To prevent inadvertent release of the lock pins 39, as by striking an object outside the trailer, shield wings 40 are placed at the ends of the angles 34 and 35, these wings extending laterally from the center frame members 26 and being welded thereto and to the ends of the angles 34 and 35 and each shield wing 40 includes an aperture 41 to permit entrance of the locking pins 39 and access to the latter for removal.

For details not mentioned above regarding the detachable connection of the axle assembly 22 to the trailer as shown in FIGS. 5 and 6, reference may be had to the above noted patent.

Accurate forward and rear positions of the axle assembly 22 are determined by engagement of the angles 28 or beams 24 as the case may be with forward and rear stops 42 and 43, respectively, secured to the undersides of the center frame members 26 and aligned center frame members 44 extending longitudinally of the trailer front section 19.

Figure 7:
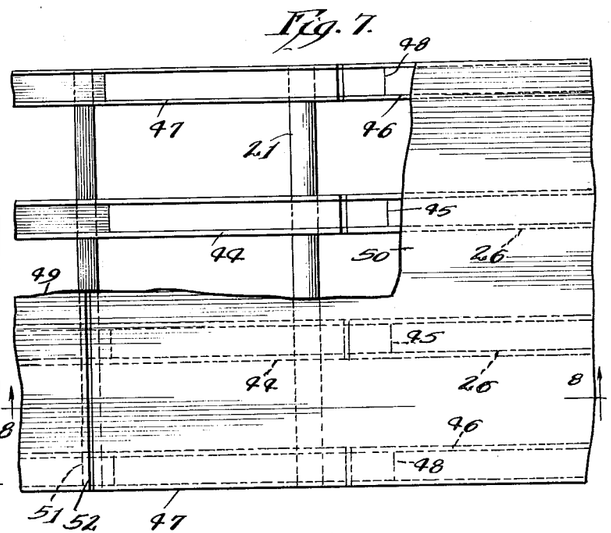
FIG. 7 is a fragmentary, plan view of the trailer bed, partially cut away, and showing the hinged sections of the trailer.
Figure 8:
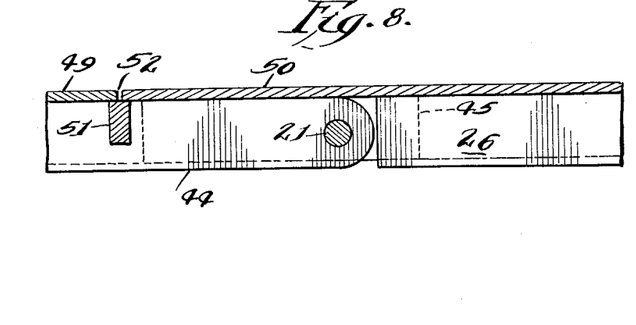
FIG. 8 is a section along the line 8—8 in FIG. 7.

Referring to FIGS. 7 and 8 and the necessity for relating the hinged trailer sections 19 and 20 so that, when in load carrying position, they will constitute a rigid beam, the center frame members 44 of the trailer front section 19 are shaped like the comparable frame members 26. One end of a bar 45 is welded within each frame member 26 to the right of the hinge pin 21 and its opposite end is bearingly received in the associated frame member 44 to the left of the hinge pin 21 when the trailer is in load carrying position. The hinge pin 21 extends also through longitudinally aligned, side frame members 46 and 47 provided on the trailer rear section 20 and the trailer front section 19, respectively, the members 46 and 47 being shape related as are the members 26 and 44. A bar 48, similar to the bar 45, is welded within each side frame member 6 and fits within the associated side frame member 47 to provide vertical support and sidewise stability.

The center and side frame members of the front and rear trailer sections 19 and 20 are overlaid by flooring 49 and 50, respectively (see FIG. 8), whose facing ends rest on a cross beam 51 to the left or forward of the hinge pin 21 and are slightly separated as indicated by the numeral 52.

Considering the vehicle 16 in position A' (FIG. 2) preparatory to loading the pump 10, the brakes on the axle assembly 22 are set, and the locking pins 39 and headed pins 38 are removed. This step breaks positive connection of the axle assembly 22 with the rear end of the trailer rear section 20. The vehicle 16 is then backed to position B' wherein the axle assembly 22 abuts the forward stops 42 and is positioned beneath the trailer front section 19 and the rear end of the trailer section 20 being unsupported rests on the ground.

After the pump 10 has been pulled onto the trailer front section 19 (position C'), the axle assembly 22 is winched rearwardly until it abuts the rear stops 43 and is then locked by the pins 38 and 39. During this movement, the axle assembly 22, through the interaction between the center frame members 26 and wings 27, exerts a camming or wedge action on such center frame members to lift them to load carrying position.

One advantage of splitting the flooring at 52 to the left of the hinge pin 21 is that, depending on the weight of the load hauled on to the vehicle, this load may be temporarily stopped at a postion in which at least some part thereof rests on the flooring 50 to the left of the hinge pin 21. The weight of the load will therefore to some extent counterbalance the weight of the trailer rear section 20 to the right of the hinge pin 21 and will facilitate movement of the axle assembly 22 to its rearmost position.

The arranging of the trailer to include relatively movable front and rear sections in connection with a shiftable trailer axle assembly provides a certain flexibility of use aside from that set forth above. For example, goods can be transferred from a loading dock to the trailer where the floor of the dock is below the normal height of the trailer floor. To accomplish this result, the vehicle 16 is backed relative to the axle assembly 22 in the manner described above until this assembly reaches a relatively forward position in which the rear end of the trailer rear section 20 is matched with and close to the dock floor. The goods may then be carried or rolled on the trailer. Where necessary, adequate support for the rear end of the trailer section 20 under these conditions may be provided by conventional struts 53 (see FIG. 6) hingedly connected to the underside of the section 20 and swingable to the dotted positions shown to rest on the ground.

In all uses of the improved vehicle 16, the tractor and trailer remain coupled and the number of steps and maneuvering space required to mount the load are materially reduced compared to present practice.

Figure 9:
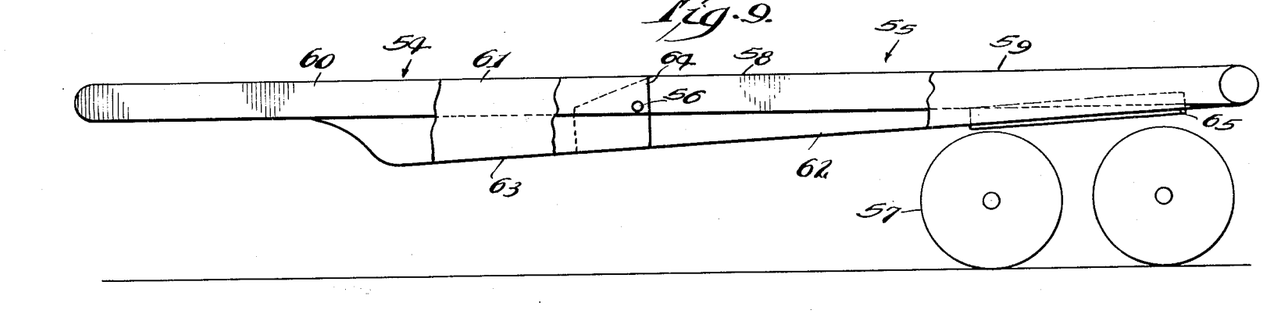
FIGS. 9 and 10 are schematic views of a modified trailer in load carrying and load receiving positions, respectively.
Figure 10:
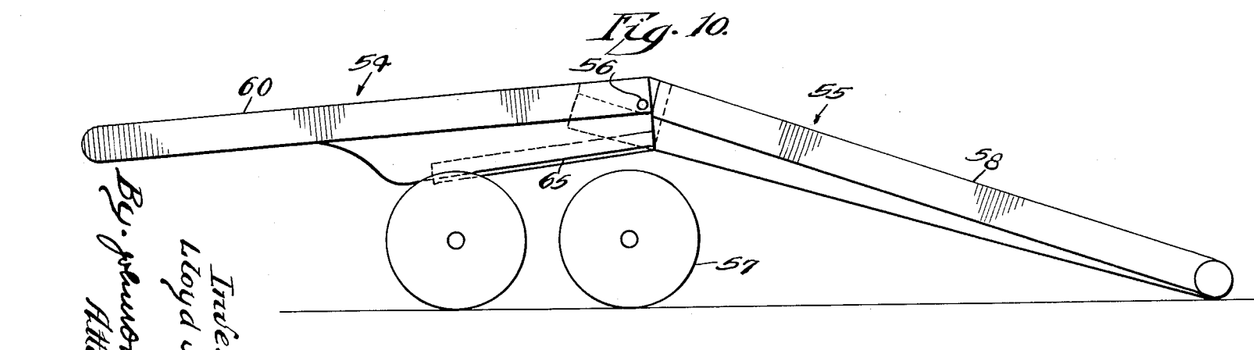

In FIGS. 9 and 10 is schematically shown a modified form of the trailer which includes front and rear sections 54 and 55, respectively, that are hingedly connected by a pin 56, the front section 54 being arranged for coupling in the usual manner to a tractor not shown, while the rear section 55 is supported in load carrying position by an axle assembly 57 arranged for sliding relation to the trailer in the manner described above.

The hinge pin extends through side and center frame members 58 and 59, respectively, in the trailer rear section 55, and through similar members 60 and 61, respectively, in the trailer front section 54. These side and center frame members may be related generally as shown in FIG. 7, but the modified arrangement differs therefrom in that the lower faces or webs 62 and 63 of the center frame members 59 and 61, respectively, are inclined to the ground when the trailer is in the load carrying condition shown in FIG. 9. Specifically, and in such condition, the faces or webs 62 and 63 are in coplanar relation, but the rear end of the face 62 is at a higher elevation than the front end of the face 63. Also in the loaded condition (FIG. 9), the top surfaces of the side frame members 58 and 60 and of the center frame members 59 and 61 are in horizontal coplanar relation so that the overlying trailer bed (not shown) would be likewise conditioned and would be split in the location 64 to the right of the hinge pin 56.

From the foregoing, it will be apparent that, as the axle assembly 57 is shifted forwardly relative to the trailer (see FIG. 10), the angle pieces 65, comparable in function the angle pieces 28, not only permit a dropping of the rear end of the trailer section 55, but also a lifting of the hinge pin 56 with an accompanying dropping of the forward end of the tractor front section 54. This latter dropping is permitted by the fifth wheel coupling to the tractor and requires no change in its conventional construction.

With this modified arrangement, it is possible to so relate the gradient of the center frame faces 62 to the length of the trailer rear section 55 that the rear end of the latter will rest on the ground when the axle assembly 57 is shifted forward.

FIGS. 11–20 illustrate another form of the invention in which the trailer is of the low-bed type. For hauling many types of heavy equipment it is essential that the over-all height be minimized, and it is always desirable that the center of gravity be kept as low as possible. This is frequently accomplished by recessing the wheels upwardly within pockets in the vehicle underframe so that the tops of the wheels are nearly flush with the deck. Cumbersome ramps are usually used to load such low bed trailers. It is accordingly an object to provide a low bed trailer in which the wheels may be shifted forwardly without interference with underframing to permit tilting of the rear portion of the trailer bed rearwardly to form a loading ramp. Another object is to provide an interconnection between the trailer bed front and rear sections whereby the bed sections will be maintained in coplanar relation when the wheels are in their normal positions and the forward section will be supported by the rear section, when the rear section is inclined, without the use of landing gear, thus making the usual landing gear unnecessary.

Figure 11:
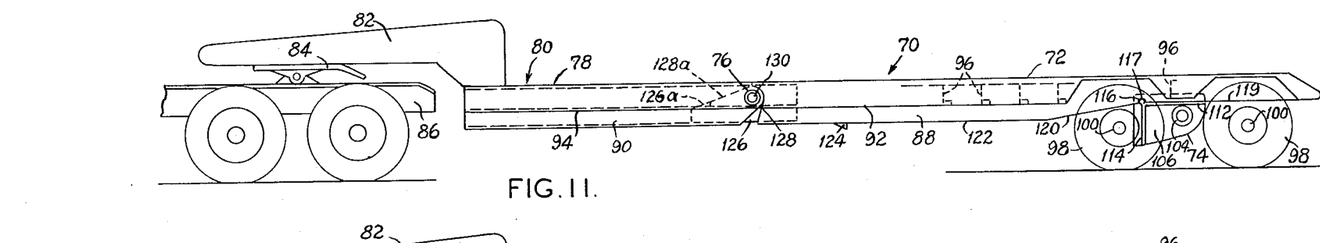
FIGS. 11-14 are side views of a modified form of the invention, showing stages in the conversion of the trailer from traveling position, in FIG. 12, to loading position in FIG. 14.

As best seen in FIG. 11, the trailer, generally indicated at 70, comprises a flat bed rear section 72 mounted near its rear end at a low level on tandem axle assembly 74, and pivotally connected, on a transverse axle, at 76 to the coplanar flat bed rear portion 78 of front section 80, the front portion of which comprises gooseneck 82 which is detachably supported at a substantially higher level than bed portions 72 and 78 by the usual fifth wheel 84 on the rear end of tractor 86.

Rear and front bed sections 72 and 78, respectively, have aligned longitudinally extending box-section center sills 88 and 90 and aligned longitudinally extending box-section side sills 92 and 94, all of which are connected by transversely extending channel-section cross ties 96 to which is secured decking 97. Rear section side sills 92 terminate forwardly of tandem axle assembly 74 and cross ties 96 are eliminated above wheels 98 of tandem axle assembly 74, to form with decking 97, downwardly and outwardly open pockets upwardly into which wheels 98 normally extend in order to maintain beds 72 and 78 at a minimum height.

Figure 14:
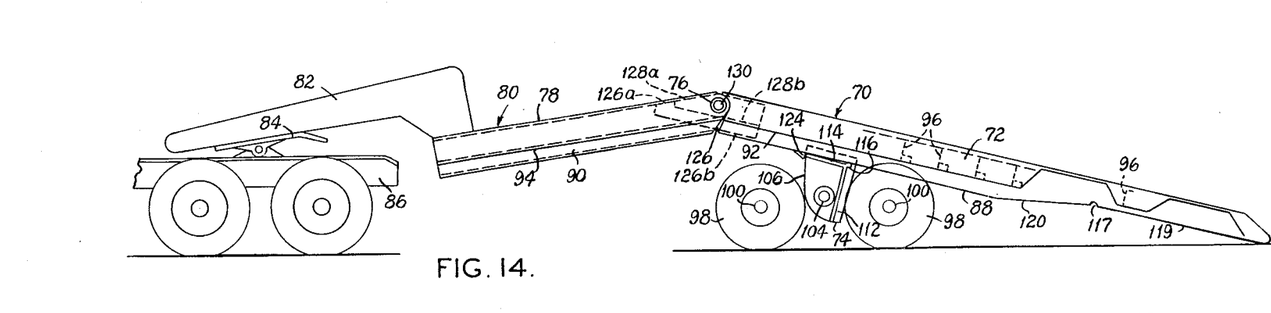

Rear bed section 72 can be utilized as a ramp for loading machinery on the trailer by shifting tandem axle assembly 74 forward to the position shown in FIG. 14, which is slightly forward of the center of mass of the entire trailer so that the rear end of the rear bed section tilts downwardly by gravitation.

To permit forward movement of tandem axle assembly 74, rear bed 72 must be elevated sufficiently to provide clearance between wheels 98 and rear bed side sills 92 and cross ties 96. To effectuate this elevation of the bed, tandem axle assembly 74, which comprises in addition to wheels 98, axles 100, leaf springs 102 supported at their ends on axles 100 and, intermediate their ends supporting main support shaft 104.

Figures 12, 13, 17:
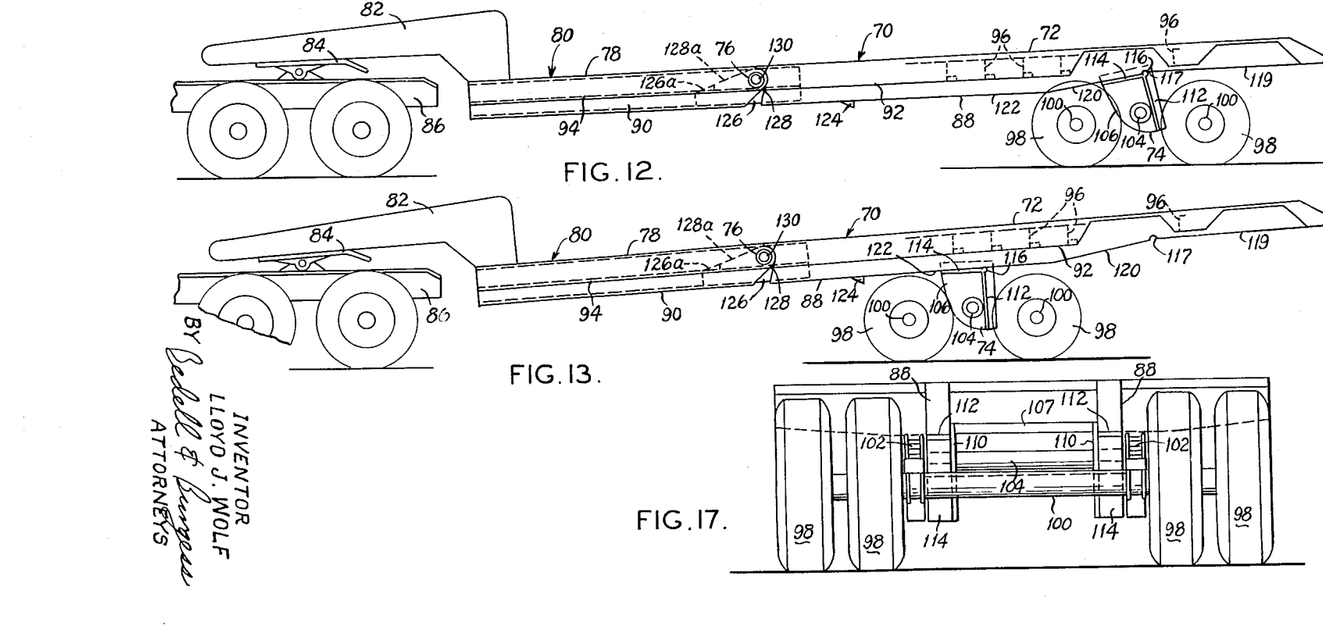
FIG. 17 is a rear end view of the tandem axle assembly.
Figure 15:
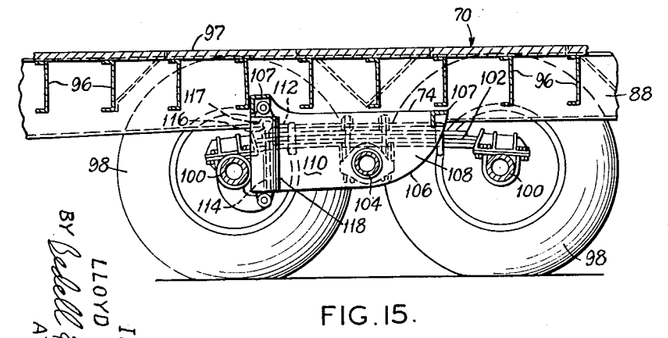
FIG. 15 is an enlarged side view of the tandem axle assembly and adjacent portions of the trailer bed in traveling position.
Figure 16:
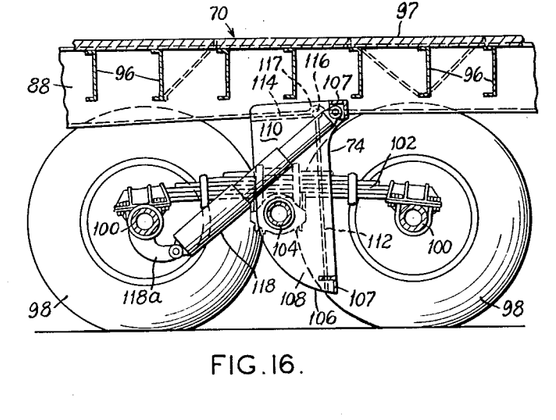
FIG. 16 is an enlarged side view of the tandem axle assembly in the trailer bed elevating position, and portions of the trailer bed.

Bed 72 is supported on springs 102 by means of a rocker assembly 106 comprising spaced rockers 108 journaled on shaft 104 beneath center sills 88 and connected by transverse angle members 107. Each of the rockers 108 consists of vertical plate 110 elongated longitudinally of the truck and abutting the inner vertical wall of the adjacent box-section center sill 88, and mounting two outwardly extending ribs 112 and 114 parallel to and slightly spaced inwardly of the plate from, respectively, the upper normally horizontal edge of plate 110 and the forward normally vertical edge of plate 110. In the normal traveling position, rib 112, which is closer to shaft 104 than is rib 114, underlyingly engages the bottom of the adjacent center sill and thus supports the trailer bed from spring 102. For positioning the rockers lengthwise of the center sills and providing a fulcrum for tilting them relative to the center sills a small-diameter transversely extending cylindrical element is positioned at the intersection of ribs 112 and 114 with the greater part of its surface protruding from the exterior of the intersection to form, in effect, a substantially three-quarter cylindrical boss 116, and the bottom wall of the sill is provided with a substantially semicylindrical upward indentation 117 in which boss 116 is normally received. The marginal portions of plates 110 protruding above and forwardly of ribs 112 and 114 form flanges slidably engaging the inner surfaces of center sills 88 to position the tandem axle assembly transversely of the trailer bed and to guide the tandem axle assembly during movement between its traveling and loading positions.

It will be evident from the foregoing that, by tilting rocker assembly 106 about shaft 104, rocker ribs 114 can be brought into supporting engagement with the bottom of center sills 88, as shown in FIG. 12, thus elevating the rear end of the trailer because of the greater distance of rib 114 than rib 112 from shaft 104. This tilting of the rocker assembly about shaft 104 is preferably accomplished by the elongation of a fluid-actuated telescoping cylinder device 118, one end of which is anchored to a bracket 118a secured by forward axle 100 of the tandem axle assembly, and the other end of which is connected to rocker 108 adjacent the intersection of ribs 112 and 114. Cylinder device 118 also serves as a cushioning means when the trailer bed is lowered from loading to traveling position. Cylinder 118 may be controlled from the driver's cab of the tractor in the same well-known way as brakes and other fluid operated apparatus on the tandem axle assembly.

Figure 18:
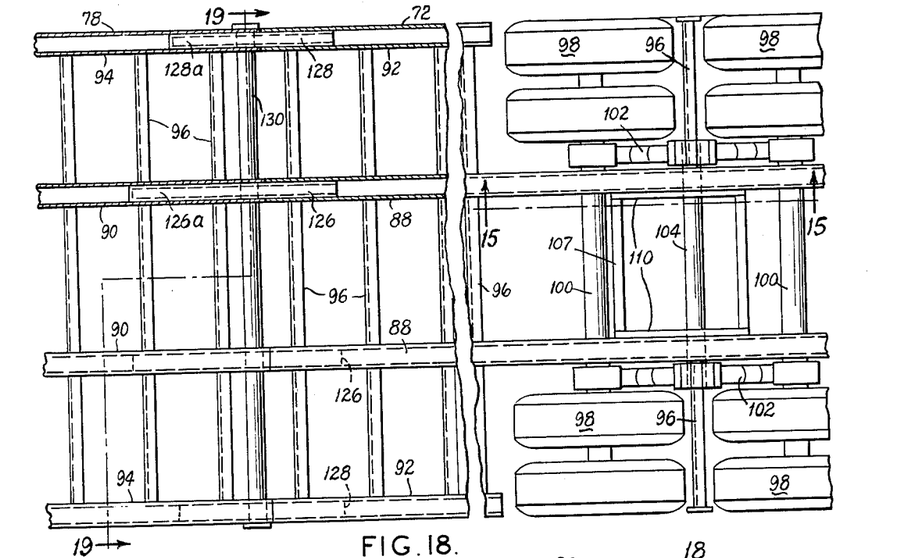
FIG. 18 is a top view of the trailer bed with the decking removed.
Figure 19:
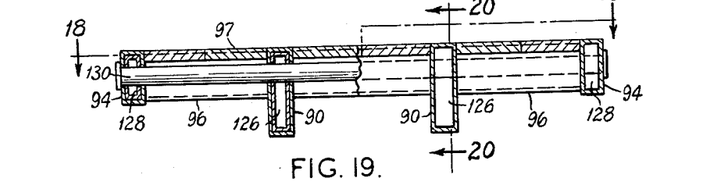
FIG. 19 is a transverse vertical sectional view along line 19—19 of FIG. 18.
Figure 20:
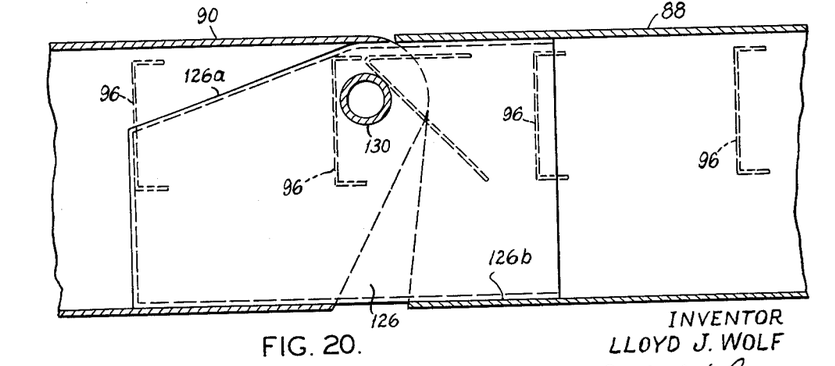
FIG. 20 is a longitudinal vertical sectional view along line 20—20 of FIG. 18.

Rearwardly of indentations 117, center sills 88 are relatively shallow as at 119 and bottoms are substantially horizontal but between indentation 117 and the forward end of the trailer bed, the center sills are gradually deepened as at 120, to a maximum depth forwardly of which their bottom walls are horizontal as at 122 at a lower level than their rear portions 119.

Accordingly, by setting the brakes (not shown) on tandem axle assembly 74 after tilting rocker assembly 106 to the position shown in FIG. 12, backing the tractor will move boss 116 out of indentation 117 and will cause the bottom surfaces of center sills 88 to slide rearwardly along the upwardly facing portions of rockers 108, causing additional elevation of the center sills during movement of center sill sloping portions 120 along the rocker surfaces.

This relative movement will continue as in FIG. 13 until shaft 104 of the tandem axle assembly is slightly forward of the center of mass of the entire trailer, being terminated by engagement of the forward edges of rockers 106 with stop abutments 124 mounted on the bottoms of center sills 88, and the rear trailer bed will gravitationally tilt to the position illustrated in FIG. 14, for use as a ramp.

To maintain the forward and rear bed sections in coplanar relation under load when the trailer is in traveling configuration, and to support the forward section without landing gear, as shown in FIG. 14, the box section extensions 126 and 128 are telescopically secured within the forward ends, respectively, of rear section center sills 88 and side sills 92 and project telescopically into the rear ends of front section center sills 90 and side sills 94, to which they are pivotally secured by a common pivot pin 130 on pivot axis 76. The bottom surfaces 126b and 128b of extensions 126 and 128 are aligned with the bottom inner surfaces of rear section sills 88 and 92, so that when tandem axle assembly is in its normal traveling position and the trailer bed sections are in their coplanar relation, the bottoms of extensions 126 and 128 will engage the bottom walls of front section center and side sills to resisting all downward bending forces and maintaining the coplanar relationship of the front and rear sections irrespective of the applied load. The top surfaces 126a and 128a of extensions 126 and 128 slope downwardly forwardly of the pivot axis, so that when the rear bed section is in the ramp-forming position, as shown in FIG. 14, extension top surfaces 126a and 128a will engage the top walls of front section center and side sills 90 and 94, thus limiting downward tilting movement of forward section 78 to the position shown in FIG. 14, making landing gears unnecessary.

Operation of the structure illustrated in FIGS. 11–20 is as follows: With the trailer in traveling position, as shown in FIG. 11, it can be unloaded by actuating fluid cylinder 118, which will tilt rockers 106 until rib 114 engages the bottom of center sills 88, to the position shown in FIG. 12, with wheels 98 out of their pockets and the side sills 92 and cross ties 96 at a higher level than the tops of the wheels. The tandem axle assembly brakes are then set, and the tractor backs the trailer until stop brackets 126 on the center sills engage the forward edges of rockers 106 and the rear section of the trailer has tilted to the ramp-forming position shown in FIG. 14. If it is not desired to load the trailer immediately, the tractor can be detached and the trailer front section will be supported by the rear section through the engagement of the sloping tops of the rear section sill extensions 126 and 128 with the top walls of the forward section sills. A tractor could be recoupled to the trailer with ease, because, even though no landing gear is provided, a heavy machine, such as a crawler tractor, could be driven up the ramp formed by the rear bed section and would, after passing the center of mass of the trailer, tend to bring the front and rear sections into coplanar relation, sagging at the pivot being prevented by the engagement of the lower surfaces of rear section sill extensions 126 and 128 with the bottom walls of the front section sills.

The tractor could then pull the trailer forward, causing rear section center sills 88 to slide along ribs 114 of rockers 106 until bosses 116 on the rockers enter identations 117 in the sill, whereupon fluid pressure in cylinders 118 could be released, after which continued forward movement of the tractor and trailer bed would cause rockers 106 to tilt forwardly about shaft 104 until rocker ribs 112 engaged the bottom surfaces of the shallow rear portions 119 of center sills 88 and the trailer bed was arranged at its minimum height for travel.

It will be evident that in all embodiments of the invention the forward limiting position of the axle assembly is forward of the center of mass of the connected sections, and the relative location or construction of the pivotal conection between the front and rear sections is such that the tractor may be removed without the forward end of the forward section dropping to the ground or alternatively requiring the usual dollies or struts for its support.

The details of the structures disclosed herein may be varied substantially without departing from the spirit of the invention, and the exclusive use of those modifications as come within the scope of the appended claims is contemplated.

I claim:

1. An open, flat bed trailer having a bed including front and rear, pivotally connected sections, the front section being arranged for coupling support on the rear end of a tractor, and an axle assembly relatively movable between a position normally supporting the rear section and in which position the beds of the front and rear sections are in coplanar relation and a selected position forward of the center of mass of the connected sections, in which the bed of the rear section is freed by said forward movement of the axle assembly for gravitational drop to a position in inclined relation to the bed of the front section and the front section remains substantially parallel to the surface on which the trailer is supported, said axle assembly including an element tiltable about a transverse axis and having a pair of surfaces relatively proximate to and remote from said axis and adapted for alternative supporting engagement with the bottom of said bed when said assembly is in its normal positions and positions forward thereof, respectively.

2. A trailer according to claim 1 in which the rear section includes longitudinal frame members and the axle assembly includes a pair of said tiltable elements guidably and slidably related thereto.

3. A trailer according to claim 1 in which the sections include aligned, longitudinal frame members each having a vertical side wall and a bottom wall and one end of a bar is secured to each forward end of the rear section frame members and extends forwardly of the pivotal connection between the front and rear sections for support engagement with the vertical side wall and bottom wall of the aligned front section frame member when the beds of the front and rear sections are in coplanar relation.

4. A trailer as defined in claim 1 wherein the rear section includes longitudinal frame members and the axle assembly includes a pair of said tiltable elements guidably and slidably related thereto such that when relatively moved from its forward to its normal rear position it exerts a wedging action on the rear section in a lifting direction to place the front and rear section beds in coplanar relation.

5. A trailer according to claim 3 in which said forward longitudinal frame members have top walls and the tops of said bars slope forwardly downwardly so as to engage said top walls of the forward frame members when the axle assembly is in its forward position and the front and rear sections are inclined relative to each other.

6. A trailer according to claim 5 in which the selected position to which said axle assembly is movable is rearwardly of the pivotal connection between said forward and rear sections.

7. An open flat bed trailer comprising a bed having front and rear pivotally connected sections, said front section being arranged for coupling support on the rear end of a tractor, wheels, an axle assembly carried by said wheels and being movable between one limiting rear position normally supporting said rear section at a low level, in which the beds of said front and rear sections are in coplanar relation and a forward limiting position in which said axle assembly is in supporting relation to said bed substantially forward of said limiting rear position, said axle assembly including a transverse pivot means, elements at each side tiltable about said pivot means and each having one transverse plane surface near said pivot and in supporting engagement with said rear section when said axle assembly is in its rear limiting position and said wheels are in said recesses and a second transverse plane surface relatively remote from said pivot and in angular relation to said first transverse plane surface, said second transverse plane surface being adapted for supporting and slidable engagement with said rear section by rotation of said rotatable elements whereby to elevate the bottom of said rear section clear of said wheels and accommodate movement of said axle assembly to its forward limiting position.

8. An open, flat bed trailer including front and rear, pivotally connected sections, the front section being arranged for coupling support on the rear end of a tractor, and an axle assembly relatively movable between a position normally supporting the rear section and in which position the beds of the front and rear sections are in coplanar relation and a selected position forward of the center of mass of the connected sections, in which the bed of the rear section is freed by said forward movement of the axle assembly for gravitational drop to a position in inclined relation to the bed of the front section and the front section remains substantially parallel to the surface on which the trailer is supported, said axle assembly being adapted when in its forward position to form the sole support of said connected sections, said axle assembly including wheels, transverse pivot means supported thereby, elements at each side tiltable about said pivot means, and each having one transverse plane surface relatively near said pivot and in supporting engagement with a bottom surface of the rear section when said axle assembly is in its normal rear position and a second transverse plane surface relatively remote from said pivot and in angular relation to said first transverse plane surface, said second transverse plane surface being adapted for supporting and slidable engagement with the bottom surface of the rear section by tilting of said tiltable elements about their axes whereby to raise said rear section from its normal height.

9. A trailer according to claim 8 in which said rear section is formed with downwardly open pockets and said wheels extend upwardly thereinto when said axle assembly is in its normal rear position.

10. A trailer according to claim 8 including power means for tilting said tiltable member to and from its normal position.

11. A trailer according to claim 8 in which there are cooperative fulcrum-forming means on said tiltable elements at the intersection of said transverse surfaces and on said rear section, said latter fulcrum-forming means being fixedly positioned on said rear section for engagement with said first-named fulcrum-forming means when said axle assembly is in its rear position.

12. A trailer according to claim 9 in which said fulcrum-forming means on said tiltable elements comprise transverse generally cylindrical bosses and the cooperative fulcrum-forming means on said rear section comprise transverse semicylindrical downwardly open apertures in the bottom of said rear section.

13. A trailer according to claim 8 in which longitudinally extending frame members form said bottom surface of the rear section and the rear portions of said frame members are relatively shallow and the front portions thereof are relatively deep, said front and rear portions being connected by intermediate sloping portions.

References Cited by the Examiner

UNITED STATES PATENTS

| 2,173,277 | 9/39 | Jarmin | 214—506 |
| 2,530,866 | 11/50 | Evans | 214—505 |
| 2,717,707 | 9/55 | Martin | 214—505 |
| 2,859,889 | 11/58 | Love | 214—505 |

FOREIGN PATENTS

| 726,877 | 3/32 | France. |
| 964,833 | 5/57 | Germany. |

HUGO O. SCHULZ, *Primary Examiner.*

MORRIS TEMIN, *Examiner.*